(12) United States Patent
Kuo

(10) Patent No.: US 9,117,085 B2
(45) Date of Patent: Aug. 25, 2015

(54) ELECTRONIC DEVICE

(71) Applicant: Getac Technology Corporation, Hsinchu (TW)

(72) Inventor: Hsiu-Yu Kuo, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 211 days.

(21) Appl. No.: 13/742,302

(22) Filed: Jan. 15, 2013

(65) Prior Publication Data

US 2014/0026224 A1 Jan. 23, 2014

Related U.S. Application Data

(60) Provisional application No. 61/674,770, filed on Jul. 23, 2012.

(30) Foreign Application Priority Data

Sep. 25, 2012 (CN) .......................... 2012 1 0359021

(51) Int. Cl.
*G06F 12/14* (2006.01)
*G06F 21/60* (2013.01)
*G06F 21/86* (2013.01)
*G06F 11/00* (2006.01)
*G06F 12/16* (2006.01)
*G08B 23/00* (2006.01)
*G06F 11/30* (2006.01)

(52) U.S. Cl.
CPC ............... *G06F 21/60* (2013.01); *G06F 21/86* (2013.01); *G06F 2221/2143* (2013.01)

(58) Field of Classification Search
None
See application file for complete search history.

(56) References Cited

U.S. PATENT DOCUMENTS

| 2004/0124980 A1* | 7/2004 | Sisson et al. ............... 340/568.1 |
| 2009/0106563 A1* | 4/2009 | Cherpantier .................. 713/194 |
| 2011/0280093 A1* | 11/2011 | Takeda .......................... 365/218 |
| 2013/0173475 A1* | 7/2013 | Lund .............................. 705/67 |

* cited by examiner

*Primary Examiner* — Shin-Hon Chen

(57) ABSTRACT

An electronic device comprises an outer case, a wireless card reader and a signal processing device. The outer case comprises a door and a metal wall. The metal wall is disposed on a lateral side of the outer case and has an opening. The door is disposed on the metal wall and capable of covering the opening. The wireless card reader is inside the door and capable of transmitting wireless signals. The signal processing device has a case, a data storage device and a safety mechanism. The signal processing device is inside the outer case and is electrically connected to the wireless card reader. The signal processing device is capable of processing the data of wireless signals from the wireless card reader. When the case is dissembled, the safety mechanism destroys at least part of the data stored in the data storage device.

10 Claims, 4 Drawing Sheets

ELECTRONIC DEVICE

BACKGROUND

1. Technical Field

The present disclosure relates to an electronic device and more particularly to an electronic device for reading identity cards.

2. Related Art

In the recent years, the government of China began to issue the second generation resident identity card (2nd generation ID card for short) to its citizens. Each of 2nd generation ID card has an embedded chip storing encrypted personal data. The encrypted personal data is read via a wireless card reader. For example, a laptop with a built-in wireless card reader is available in the market. The laptop includes an antenna of the wireless card reader. The antenna is disposed between a display panel and a keyboard of the laptop. In order to read the 2nd generation ID card by the antenna of the wireless card reader, a user has to open the laptop for exposing the antenna of the wireless card reader. However, it is inconvenient for users to open the laptop first before reading the 2nd generation ID card.

SUMMARY

An electronic device disclosed in an embodiment of the present disclosure comprises an outer case, a wireless card reader and a signal processing device. The outer case comprises a door and a metal wall. The metal wall has an opening and is disposed on a lateral side of the outer case. The door is disposed on the metal wall for covering the opening. The wireless card reader is inside the door for transmitting wireless signals. The signal processing device comprises a case, a data storage device and a safety mechanism. The signal processing device is inside the outer case and is electrically connected to the wireless card reader. The signal processing device is capable of processing the wireless signals from the wireless card reader. When the case is dissembled, the safety mechanism destroys at least part of the data stored in the data storage device.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
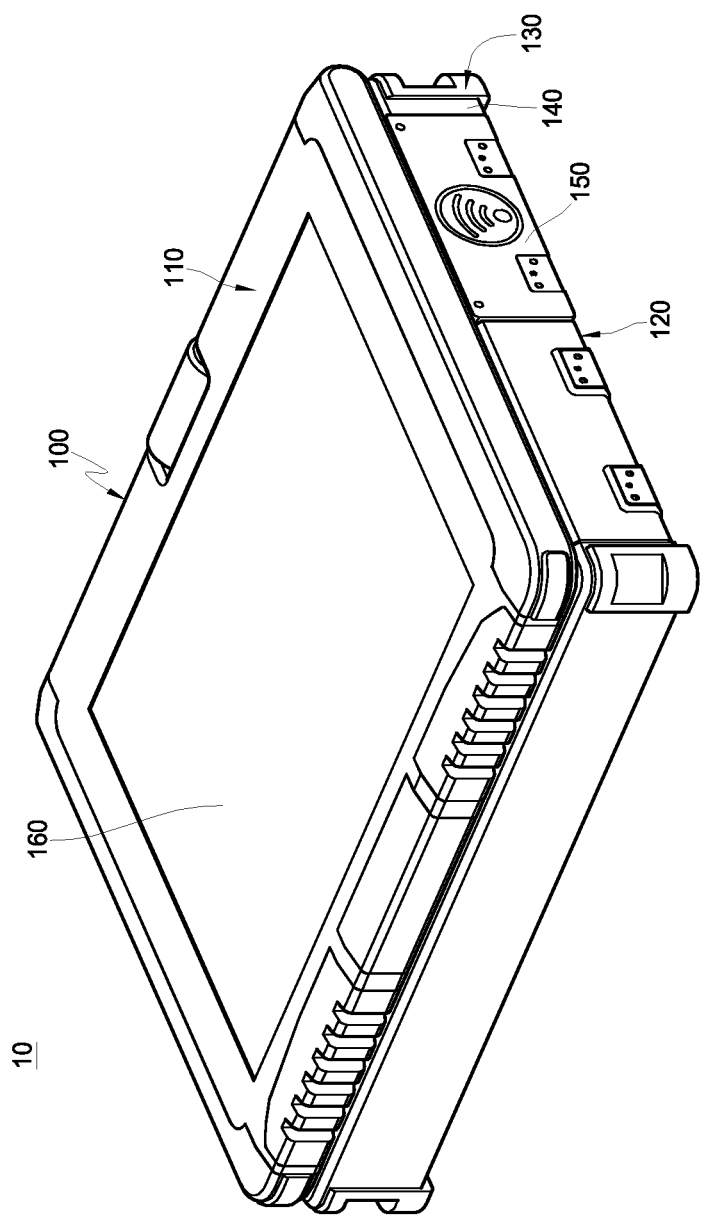
FIG. 1 is a schematic diagram of an electronic device according to an embodiment of the disclosure.
Figure 2:
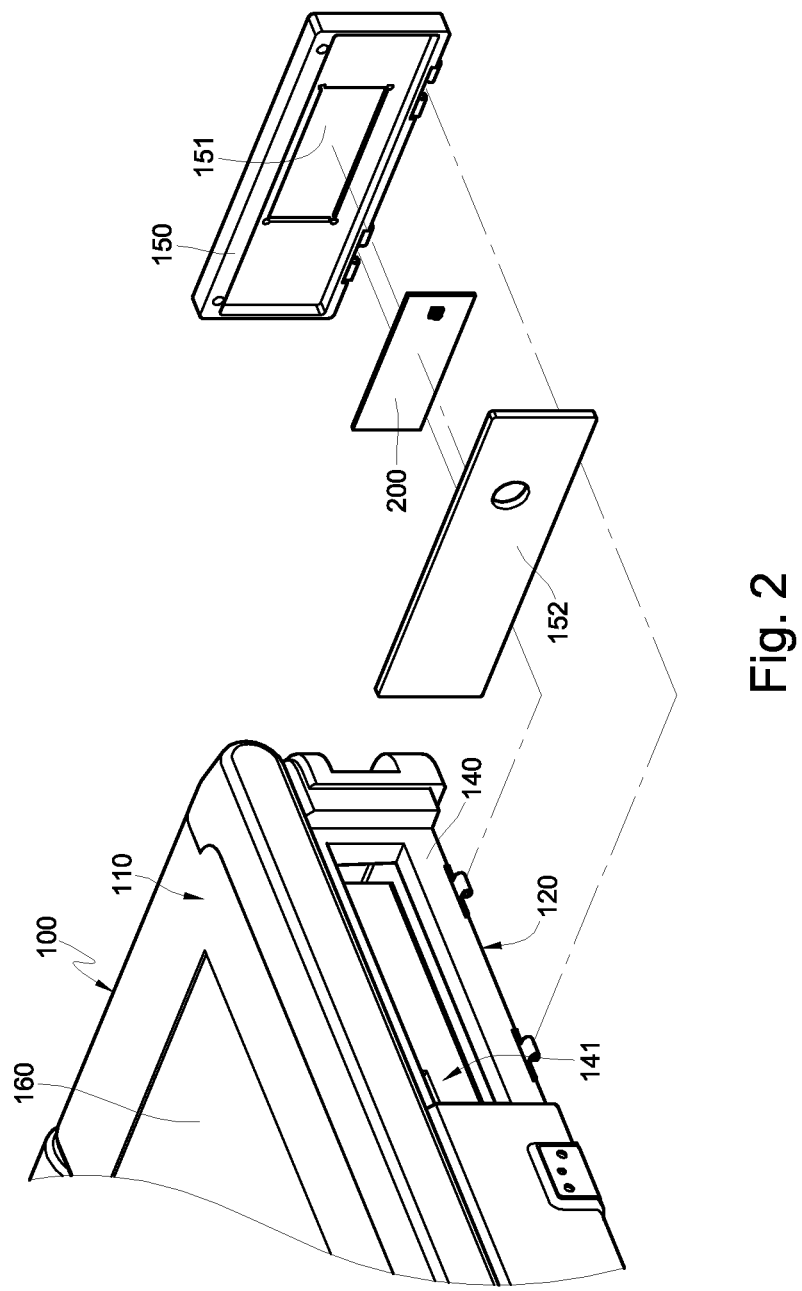
FIG. 2 is a partial exploded view of the electronic device of FIG. 1.
Figure 3:
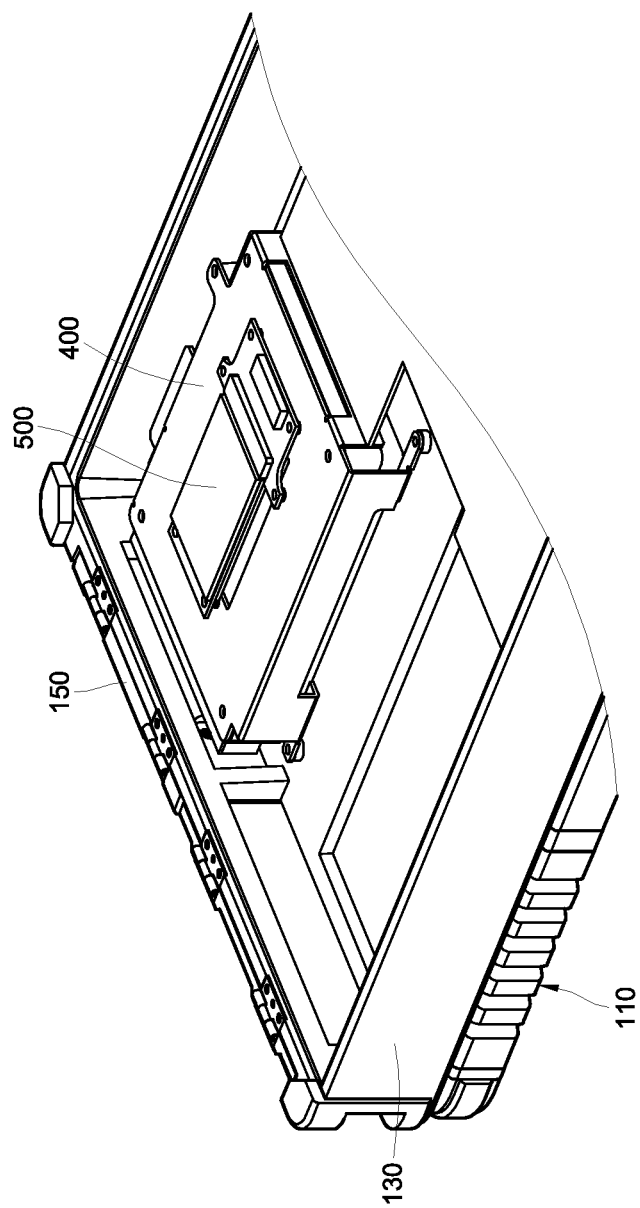
FIG. 3 is a partial perspective view of the electronic device of FIG. 1.
Figure 4:
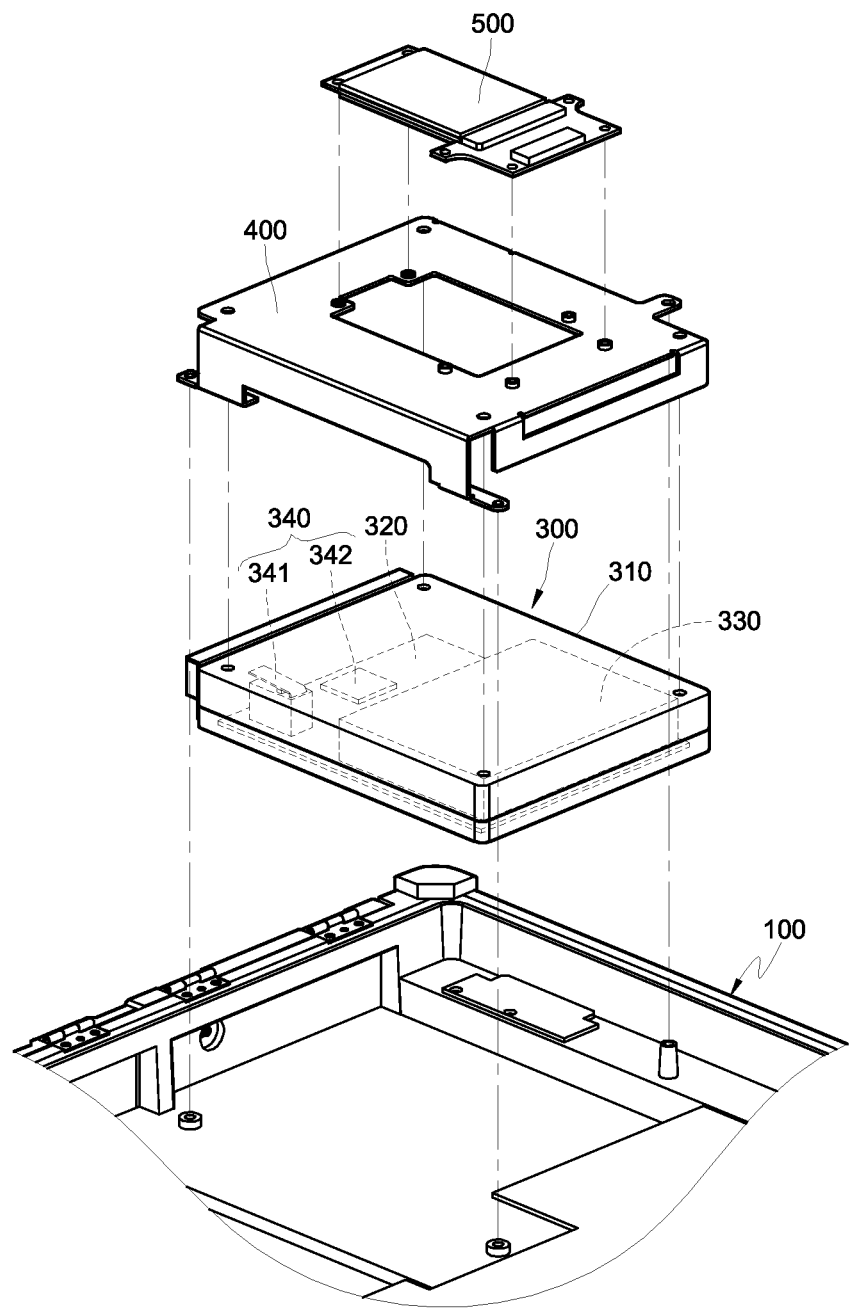
FIG. 4 is an exploded view of FIG. 3.

Please refer to FIGS. 1 to 4. FIG. 1 is a schematic diagram of an electronic device according to an embodiment of the disclosure. FIG. 2 is a partial exploded view of the electronic device of FIG. 1. FIG. 3 is a partial perspective view of the electronic device of FIG. 1; and FIG. 4 is an exploded view of FIG. 3.

An electronic device 10 of the embodiment comprises an outer case 100, a wireless card reader 200 and a signal processing device 300.

The outer case 100 has a front side 110, a rear side 120 opposite to the front side, and a lateral side 130 between the front side 110 and the rear side 120. A display panel 160 is disposed on the front side 110 of the outer case 100. A keyboard (not shown in the drawings) is disposed between the display panel 160 and the rear side 120.

The outer case 100 comprises a metal wall 140 and a door 150. The metal wall 140 is disposed on the lateral side 130 of the outer case 100. The metal wall 140 has an opening 141. The door 150 is disposed on the metal wall 140 for covering or exposing the opening 141. The door 150 is pivotally connected to the metal wall 140. The door 150 can turn pivotally away from the metal wall 140 in order to expose the opening 141, or can turn pivotally toward the metal wall 140 in order to cover the opening 141.

In this embodiment, the wireless card reader 200 is an antenna. The wireless card reader 200 is used for transmitting wireless signals and reading second generation identity cards (2nd generation ID card for short). The wireless card reader 200 is disposed in the door 150. The door 150 further comprises an insulation body 151 and a waterproof element 152. The wireless card reader 200 is between the insulation body 151 and the waterproof element 152 so that the waterproof effect of the wireless card reader can be enhanced. In this embodiment, the waterproof element 152 is a sponge.

In this embodiment, the insulation body 151 is made of a non-conductive material and the wireless card reader 200 can transmit the signals via the insulation body 151. The insulation body 151 is used for electrically insulating the wireless card reader 200 from the metal wall 140. The insulation body 151 can be omitted if the door 150 is made of a non-conductive material.

The wireless card reader 200 is inside the door 150. When the electronic device 10 is closed, the door 150 is still exposed on the outer surface of the outer case 100 of the electronic device 10 and the wireless card reader 200 can transmit the signals to a 2nd generation ID. Therefore, a user can use the wireless card reader 200 to read the 2nd generation ID card.

The signal processing device 300 is inside the outer case 100 and is electrically connected to the wireless card reader 200. The signal processing device 300 is capable of processing the wireless signals from and to the wireless card reader 200. The signal processing device 300 comprises a case 310, a first data storage device 330 and a safety mechanism 340. The first data storage device 330 and the safety mechanism 340 are inside the case 310. An enclosed space is formed inside the case 310. Furthermore, the signal processing device 300 comprises a circuit board 320 inside the case 310. The first data storage device 330 and the safety mechanism 340 are electrically connected to the circuit board 320. The first data storage device 330 stores data including an encrypted personal data, at least one encoding key and at least one decoding key. The safety mechanism 340 comprises a switch 341 and a processor 342. The switch 341 and the processor 342 are electrically connected to the circuit board 320. The switch 341 is pressed when the case 310 of the signal processing device 300 remains intact. The switch 341 is not pressed when the case 310 of the signal processing device 300 is dissembled. The processor 342 destroys at least a part of the data stored in the first data storage device 330 when the switch 341 is not pressed. The at least part of the data can be the encryption key, the decoding keys, the encrypted personal data or all the data stored in the first data storage device 330. In this embodiment, the at least part of the data is the encrypted personal data. Therefore, once someone dissembles the case 310 for stealing the data stored in the first storage 330, the safety mechanism 340 can prevent the encrypted personal data from being stolen.

In this and some embodiments, the electronic device 10 further comprises an frame 400 and a second data storage device 500. The frame 400 is assembled on the signal processing device 300. The second data storage device 500 is assembled on the frame 400 for providing extra storage space for storing or accessing data.

According to the electronic device disclosed in the above embodiment, the wireless card reader is inside the door which is disposed on the lateral side of the electronic device. Therefore, whether the electronic device is opened, the user can still use the wireless card reader to read the 2nd generation ID card. As a result, the convenience of using the wireless card reader can be enhanced.

Furthermore, once someone tries to steal the data stored in the first storage by dissembling the case, the safety mechanism can prevent the encrypted personal data stored in the first data storage device from being stolen.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. An electronic device, comprising:
   an outer case comprising a door and a metal wall, the metal wall being disposed on a first lateral side of the outer case and having an opening, the door being pivotally connected to the metal wall and movable between a position covering the opening and a position pivoted away from the metal wall;
   a wireless card reader embedded in the door for transmitting wireless signals; and
   a signal processing device having a case, a first data storage device and a safety mechanism, the signal processing device being inside the outer case and electrically connected to the wireless card reader for processing the wireless signals from the wireless card reader, wherein the safety mechanism destroys at least a part of the data stored in the first data storage device when the case is dissembled;
   wherein the signal processing device comprises a circuit board, the safety mechanism comprises a switch and a processor, the switch and the processor are electrically connected to the circuit board, the data storage device is electrically connected to the circuit board, the switch is between the circuit board and the case, the switch is actuated when the case is dissembled, and the processor destroys at least a part of the data stored in the data storage when the switch is actuated.

2. The electronic device as claimed in claim 1, wherein the door is made of a non-conductive material.

3. The electronic device as claimed in claim 1, wherein the door further comprises an insulation body and a waterproof element, and the wireless card reader is between the waterproof element and the insulation body.

4. The electronic device as claimed in claim 3, wherein the waterproof element is a sponge.

5. The electronic device as claimed in claim 1, wherein the wireless card reader is an antenna.

6. The electronic device as claimed in claim 1, further comprising an frame and a second data storage device, the frame being assembled on the signal processing device, and the second data storage device being assembled on the frame.

7. The electronic device as claimed in claim 1, wherein the safety mechanism destroys all the data stored in the data storage when the case is dissembled.

8. The electronic device as claimed in claim 1, wherein the first data storage stores data including an encoding key, an decoding key and an encrypted personal data, and the safety mechanism destroys the encoding key, the decoding key or the encrypted personal data when the case is dissembled.

9. The electronic device as claimed in claim 1, further comprising a display panel pivotally connected to a second lateral side of the outer case, wherein the door is opened independently of the display panel.

10. The electronic device as claimed in claim 1, wherein the electronic device is a laptop computer, further comprising a display panel pivotally connected to a second lateral side of the outer case, wherein the door is opened independently of the display panel.

* * * * *